US007026912B2

(12) United States Patent
Suzuki

(10) Patent No.: US 7,026,912 B2
(45) Date of Patent: Apr. 11, 2006

(54) ENGINE CONTROL APPARATUS

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 232 days.

(21) Appl. No.: 10/791,679

(22) Filed: Mar. 3, 2004

(65) Prior Publication Data

US 2004/0257201 A1 Dec. 23, 2004

(30) Foreign Application Priority Data

Mar. 6, 2003 (JP) .......................... P.2003-060294

(51) Int. Cl.
*H04Q 1/00* (2006.01)

(52) U.S. Cl. ................. 340/5.62; 340/5.72; 340/10.52; 114/5.5; 440/1; 180/272

(58) Field of Classification Search ............... 340/5.72, 340/5.61, 5.62, 5.31, 10.51, 10.52, 5.25, 340/426.11; 307/10.5; 114/5.55; 440/1, 440/84; 180/272
See application file for complete search history.

(56) References Cited

U.S. PATENT DOCUMENTS 5,506,575 A * 4/1996 Ormos ....................... 340/5.23
6,352,045 B1 * 3/2002 Takashima ................. 114/55.5
6,659,343 B1 * 12/2003 Tanaka ....................... 235/380

FOREIGN PATENT DOCUMENTS

JP 2001-088789 A 4/2001
JP 2001-146148 A 5/2001

* cited by examiner

*Primary Examiner*—Edwin C. Holloway, III
(74) *Attorney, Agent, or Firm*—Sughrue Mion, PLLC

(57) ABSTRACT

An engine control apparatus includes: a stop switch body 6; a stop switch knob 3; a lock plate 5; a transponder 9 that is provided at the lock plate side and that can transmit a predetermined ID code; and a control section 11 that can receive the ID code transmitted from the transponder 9 and that controls based on the ID code the engine operation of the small motorboat. The engine control apparatus is structured such that, when the lock plate 5 is disengaged from the stop switch knob 3, the stop switch body 6 is activated to allow the engine to stop or to be in an idling state. The engine control apparatus also includes the writing section 16 for writing a regular ID code of a transponder to another transponder.

4 Claims, 11 Drawing Sheets

(FIG. 8 CONTINUED)
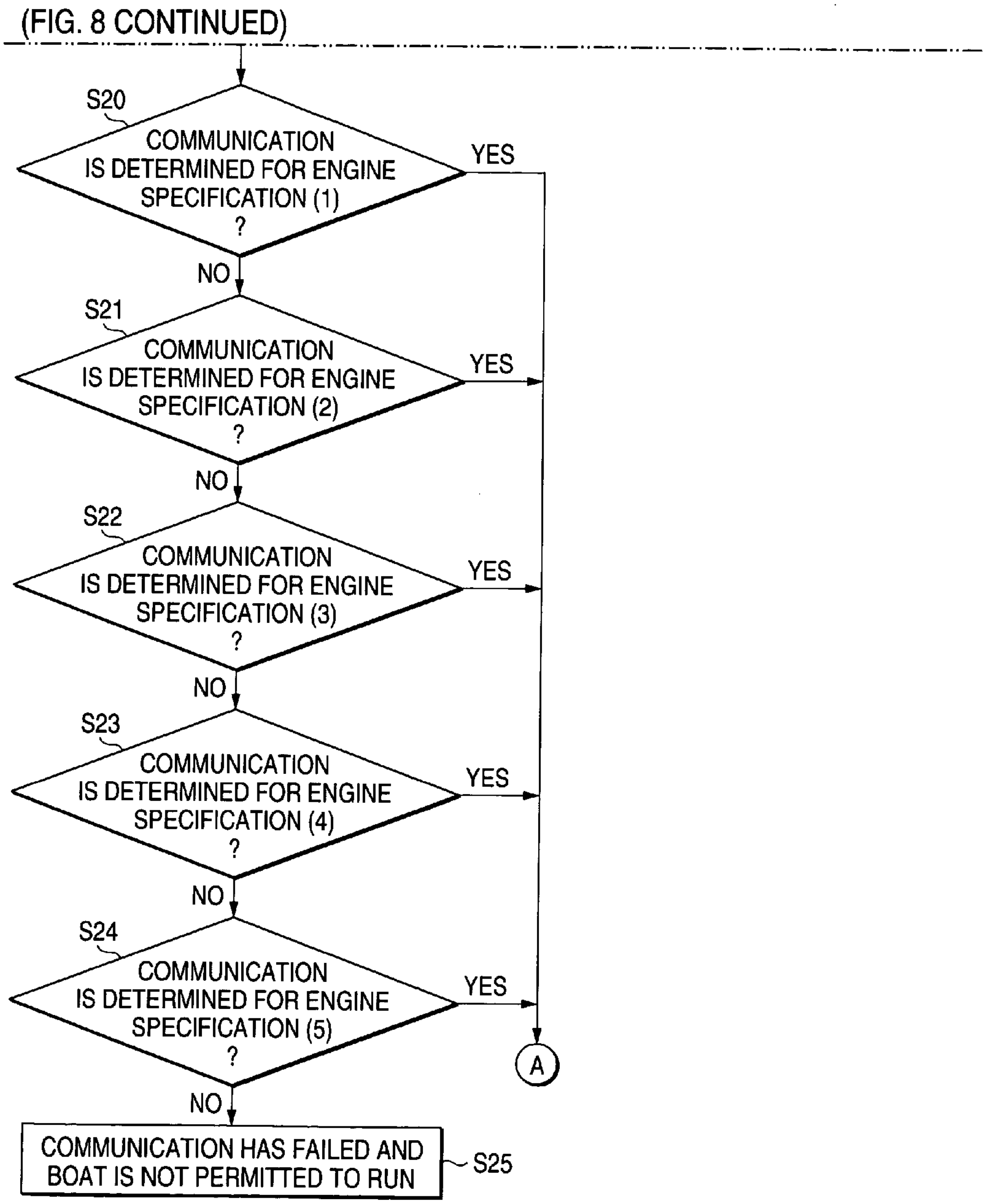

(CONT.)

(FIG. 9 CONTINUED)
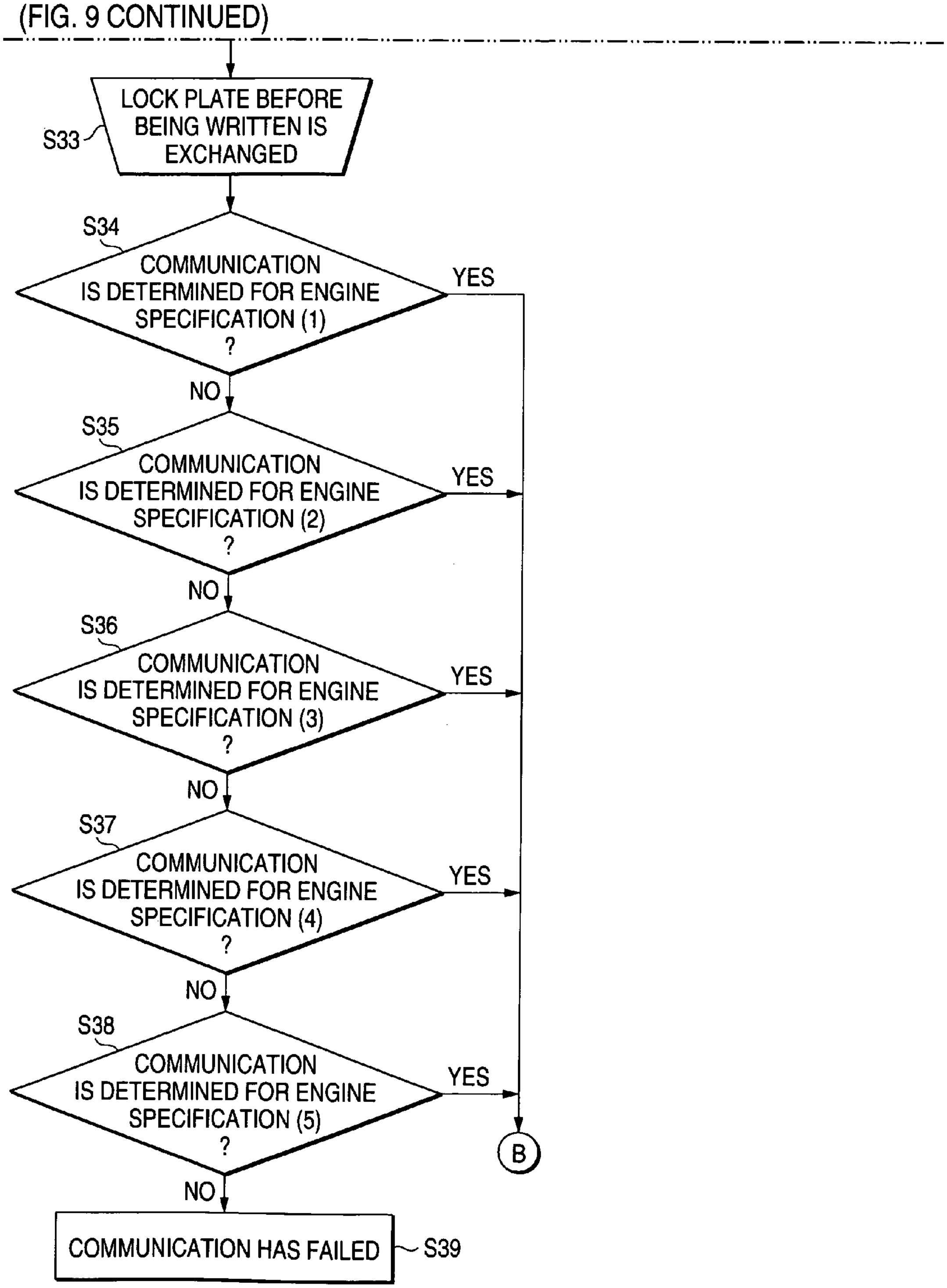

ENGINE CONTROL APPARATUS

BACKGROUND OF THE INVENTION

The present invention relates to an engine control apparatus including such that, when a lock plate is disengaged from a stop switch knob, the stop switch is turned on to allow an engine of a small motorboat etc., to stop or to be in an idling state.

A small motorboat is made to glide over water while taking a sharp turn or jumping so that an operator can enjoy a ride. This frequently causes the operator to fall into water. Due to this reason, it is required to, when the operator falls into water, stop the engine to prevent only the small motorboat from further progressing. Thus, a small motorboat is generally provided with a stop switch for allowing, when the operator falls into water, the engine to stop or to be in an idling state.

Specifically, a stop switch knob for activating the stop switch has an insertable resin-made lock plate that has at the base end a tightened wire. The tip end of the wire is fixed to the operator's wrist or the like. This allows, when the operator falls into water, the lock plate to be disengaged from the stop switch knob to turn on the stop switch, thereby allowing the engine of the small motorboat to stop or to be in an idling state.

As described above, the lock plate is inserted to the stop switch knob to allow the engine to start. This causes a situation where, when another lock plate of a small motorboat or a plate member having a similar shape to the lock plate is inserted, a third party can start the engine with out the owner's permission. In order to prevent such a situation where a boat is stolen, a conventional technique (as disclosed in Patent Document 1, for example) has suggested that a transponder incorporating an ID code is embedded in a lock plate and an engine control section is provided in the vicinity of a stop switch.

The above conventional engine control apparatus is structured such that the ID code of the transponder is transmitted via radio transmission to the control section so that the engine is started only when a previously registered regular ID code and the received ID code are the same. When the former is different from the latter, the engine is not started. This can start the small motorboat only when the regular lock plate is inserted to the stop switch knob and thus can prevent the boat from being stolen.

[Patent Reference 1]

Japanese Published Unexamined Patent Application No. 2001-88789

However, the above conventional engine control apparatus causes a situation where, when a lock plate incorporating a transponder is lost, a regular ID code having the transponder is unknown and thus a lock plate having another transponder and a control section must be changed. In order to prevent such a case, a dealer always controls the regular ID code so that another transponder having the ID code can be prepared if the lock plate is lost, thus making it needless to change the control section. However, such a control by the dealer causes another problem of increased cost.

SUMMARY OF THE INVENTION

The present invention is made in view of the above. It is an object of the present invention to provide an engine control apparatus that allows the user to prepare a back-up transponder easily.

The present invention according to Aspect 1 is characterized in that: an engine control apparatus, includes: a stop switch body for allowing an engine to stop or to be in an idling state; a stop switch knob that abuts with the stop switch body to activate the stop switch body to allow the engine to stop or to be in an idling state; a lock plate that is insertable to the stop switch knob; a transponder that is provided at the lock plate side and that can transmit a predetermined ID code; and a control section that can receive the ID code transmitted from the transponder and that can control based on the ID code the engine operation, wherein the engine control apparatus includes such that, when the lock plate is disengaged from the stop switch knob, the stop switch body is activated to allow the engine to stop or to be in an idling state; and the engine control apparatus includes a writing section for writing a regular ID code of a transponder to another transponder.

The present invention according to Aspect 1 is characterized in that: the control section changes the engine performance based on the ID code from the transponder and, when the writing section is used to write the regular ID code of a transponder to another transponder, a to-be-specified engine performance can be changed in the engine control apparatus according to Aspect 1.

The present invention according to. Aspect 3 is characterized in that a display section is provided for displaying the difference in the engine performance specified for the transponder.

DETAILED DESCRIPTION OF THE PREFERRED EMBODIMENTS

Hereinafter, embodiments of the present invention will be specifically described with reference to the drawings.

Figure 1:
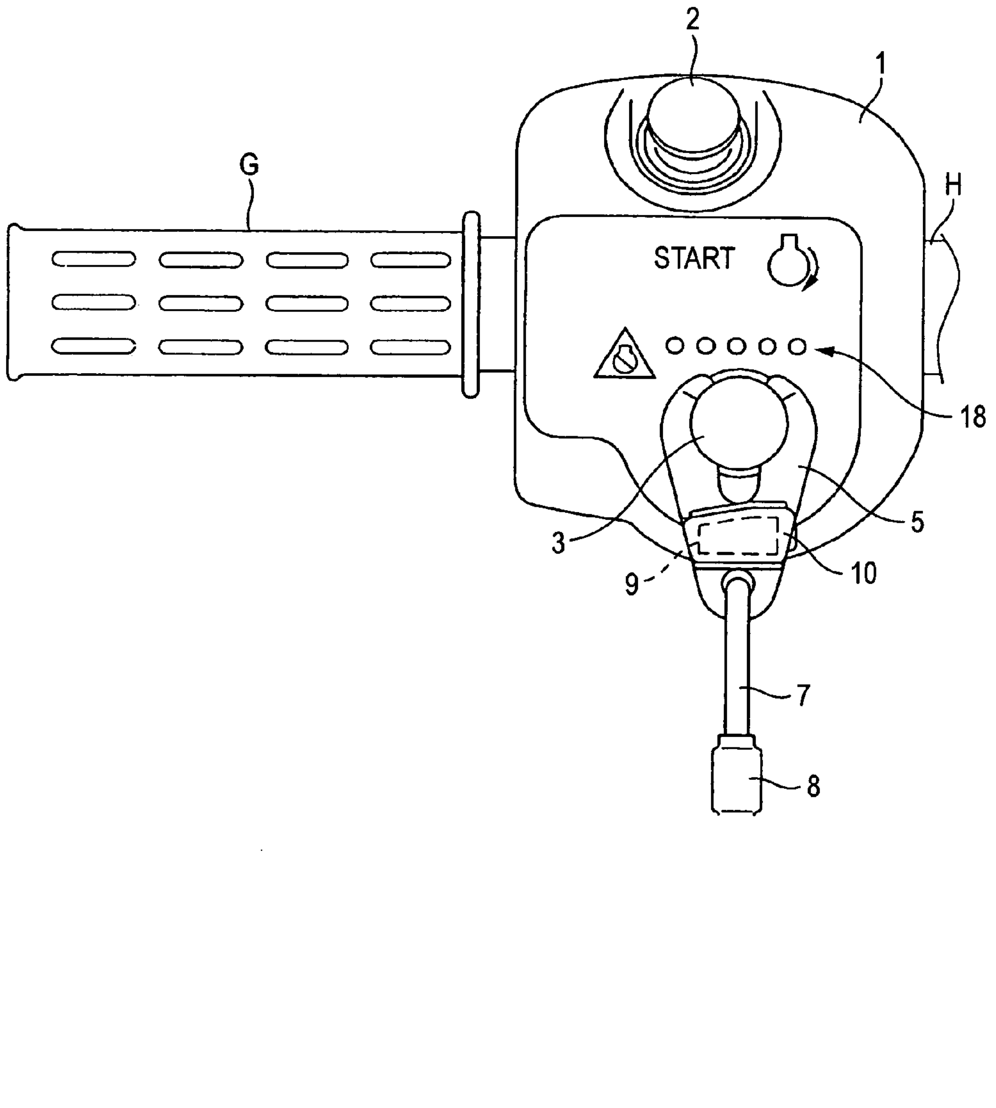
FIG. 1 is a top view illustrating the engine control apparatus for the small motorboat according to an embodiment of the present invention.
Figure 2:
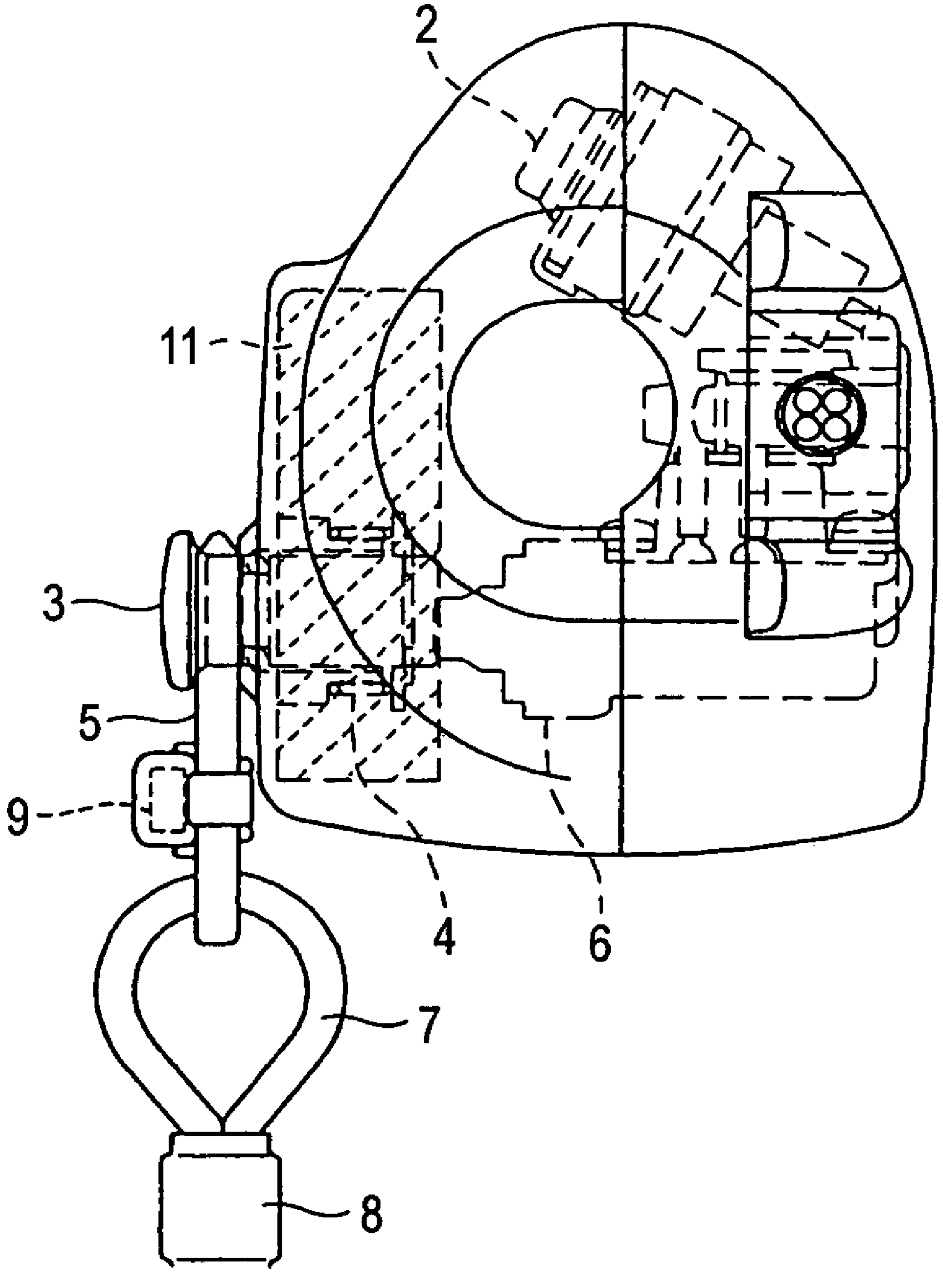
FIG. 2 is a right side view of FIG. 1.

As shown in FIG. 1 and FIG. 2, the engine control apparatus for the small motorboat according to embodiment 1 is formed in the resin-made switch case 1 fixed to the handle bar H of the small motorboat. The switch case 1 includes the start switch knob 2, the stop switch knob 3, the stop switch body 6, and the control section 11. The reference numeral G in FIG. 1 denotes a grip that is grasped by an operator when the operator operates the boat.

The start switch knob 2 is used to start the engine of the small motorboat. The knob includes such that, when the knob is pushed, then predetermined electrical conduction may be provided to start the engine. The start switch knob 2 can be provided to the switch case 1 with an arbitrary position and inclination angle.

As shown in FIG. 2, the stop switch knob 3 is always biased by the spring 4 toward the direction adjacent to the surface of the switch case 1 (right direction in the same drawing). When the lock plate 5 which will be described later is inserted between the surface of the switch case 1 and the projection of the stop switch knob 3 (as shown in the same drawing), then the base end of the stop switch knob 3 (right tip end in the same drawing) is separated from the stop switch body 6.

The stop switch body 6 is provided in the switch case 1 and is activated when abutting with the base end of the stop switch knob 3 to allow the engine of the small motorboat to stop or to be in an idling state. This allows, when the lock plate 5 is disengaged from the stop switch knob 3, the stop switch body 6 to activate to allow the engine of the small motorboat to be forcedly stopped or to be in an idling state.

Figure 3:
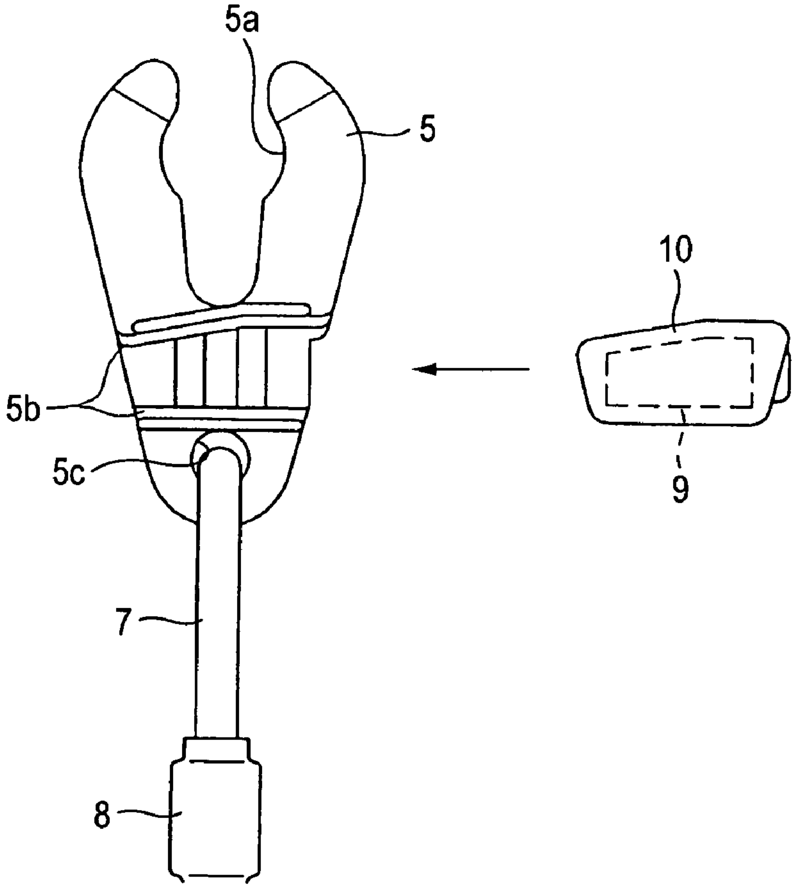
FIG. 3 is a top view illustrating the lock plate and the attachment of the engine control apparatus for the small motorboat according to the embodiment of the present invention.

The lock plate 5 includes a resin-made plate-like member and includes, as shown in FIG. 3, the notch 5*a* at one end in the plan view. The lock plate 5 also has at the substantial center two convex sections 5*b* and has at the other end of the plan view a hole 5*c* to which the wire 7 is inserted. The tip end of the wire 7 (not shown) is designed to be attached to the wrist or the like of an operator of the small motorboat.

When the notch 5*a* is engaged with or separated from the periphery side of the stop switch knob 3, the lock plate 5 can be inserted to the stop switch knob 3. This allows, when the operator falls into water, the lock plate 5 to be disengaged from the stop switch knob 3 via the wire 7. In the drawing, the reference numeral 8 denotes a circular ring-shaped metal fitting for inserting the tip end of the wire 7 to the hole 5*c*.

Figure 4:
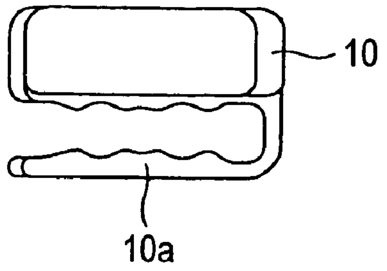
FIG. 4 is a front view illustrating the attachment of the engine control apparatus for the small motorboat according to the embodiment of the present invention.

The two convex sections 5*b* formed in the lock plate 5 have a groove-like shape over the surface of the lock plate 5 to which the resin-made attachment 10 incorporating the transponder 9 can be attached. Specifically, the clip section 10*a* forms at the lower face of this attachment 10 as shown in FIG. 4. The attachment 10 is formed such that, when the clip section 10*a* sandwiches the top and back face of the lock plate 5 (more specifically, the space between the two convex sections 5*b*), the attachment 10 can be attached.

The transponder 9 is provided at the lock plate 5 to hold a previously registered regular ID code and can transmit the ID code from an antenna (not shown) via radio transmission. The ID code includes information or a unique password for providing an arbitrary engine performance. The engine performance information includes, for example, information regarding the engine specification for a race, for the experienced user (high performance), for a general user (cruise), for a beginner (course), or for children (run). In this embodiment, the engine is first allowed to be in an idling state when the lock plate 5 is engaged with the stop switch knob 3 to subsequently start the activate switch knob 2.

Figure 5:
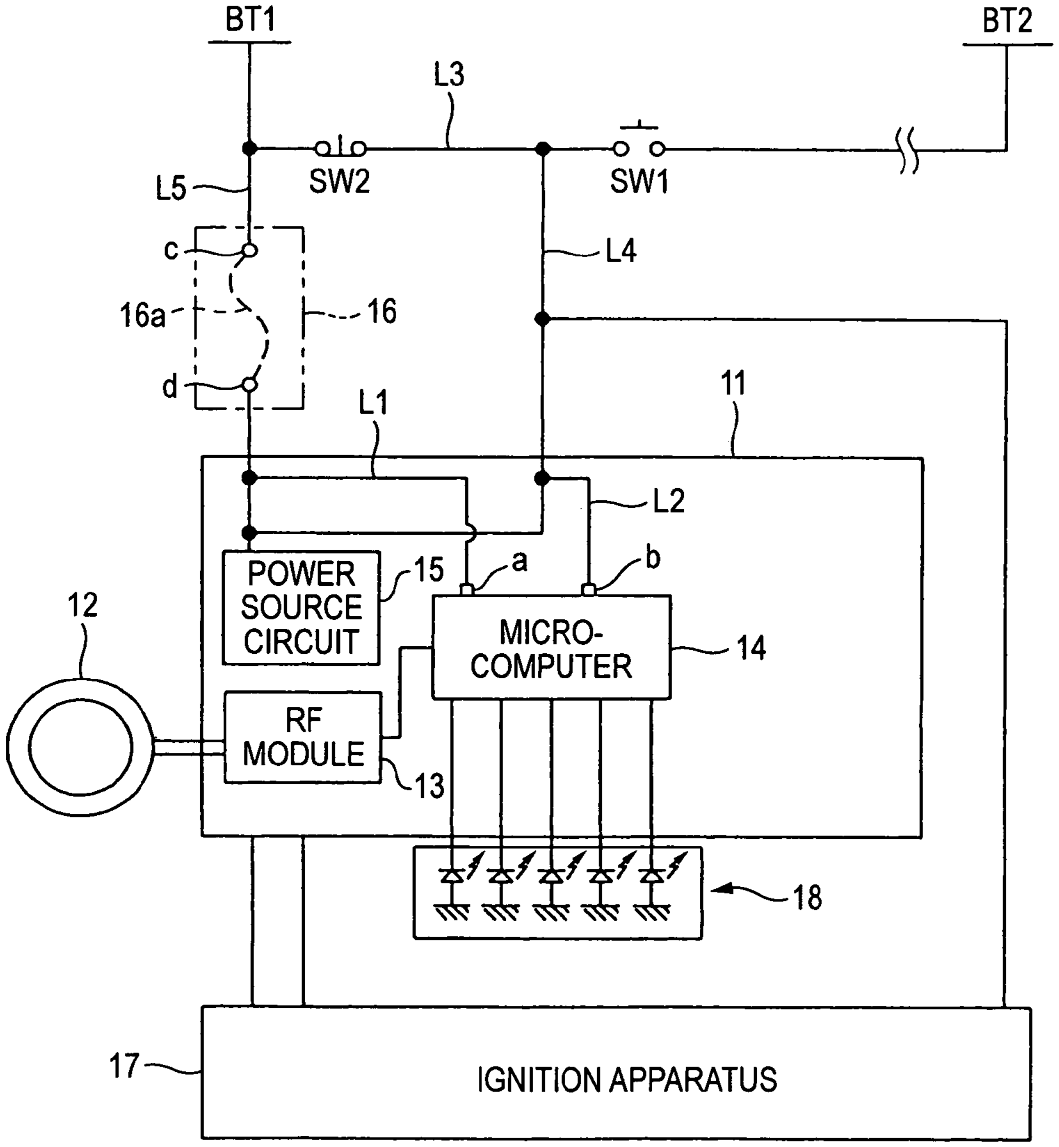
FIG. 5 is a block diagram illustrating the control section and the neighboring structure of the engine control apparatus for the small motorboat according to the embodiment of the present invention.

As shown in FIG. 5, the control section 11 includes: the antenna 12, the RF module 13, the microcomputer 14, and the power source circuit 15. The control section 11 is provided in the vicinity of the stop switch body 6 in the switch case 1 (see FIG. 1 and FIG. 2). Among these, the antenna 12 receives an ID code from the transponder 9 and has a coil-like shape and is connected via the Rf module 13 to the microcomputer 14. The control section 11 is electrically connected to the engine ignition apparatus 17 and includes to control, based on the ID code received by the antenna 12 (information for engine performance or a unique password), the engine operation of the small motorboat.

Specifically, when the antenna 12 has received the ID code from the transponder 9, the microcomputer 14 determines whether the ID code (particularly unique password) is a previously registered regular ID code (unique password) or not. When the ID code is a regular ID code, the engine performance is changed based on the information possessed by the ID code. When the ID code is not a regular ID code, the engine is caused to be in an idling state in which the boat cannot run.

In this way, the control section 11 changes the engine performance based on the ID code from the transponder 9 and the transponder 9 is detachably attached to the lock plate 5. This allows the operator to easily exchange the transponder 9 according to need. Specifically, the engine performance can be arbitrarily changed depending on the operator's preference in an easy manner.

As shown in the same drawing, the microcomputer 14 also provides the writing terminal a and the power source terminal b from each of which the wirings L1 and L2 extend. On the other hand, the wiring L3 in the drawing shows a layout in which there is provided: the stop switch SW2 that is closed when the start switch knob 2 is engaged with the lock plate 5 and that is opened when the start switch knob 2 is detached from the lock plate 5; and the starter switch SW1 switched in connection with the start switch knob 2. One end of the wiring L3 is connected to the battery BT1 and the other end is connected to the battery BT2 via a starter relay or the like (not shown).

The wiring L4 extending to the power source circuit 15 is connected between the starter switch SW1 and the stop switch SW2 in the wiring L3, at the middle of which the tip end of the wiring L2 extending from the power source terminal b is connected. on the other hand, the power source circuit 15 is connected with the wiring L5 extending to the battery BT1, at the middle of which the writing section 16 is interposed.

Figure 6:
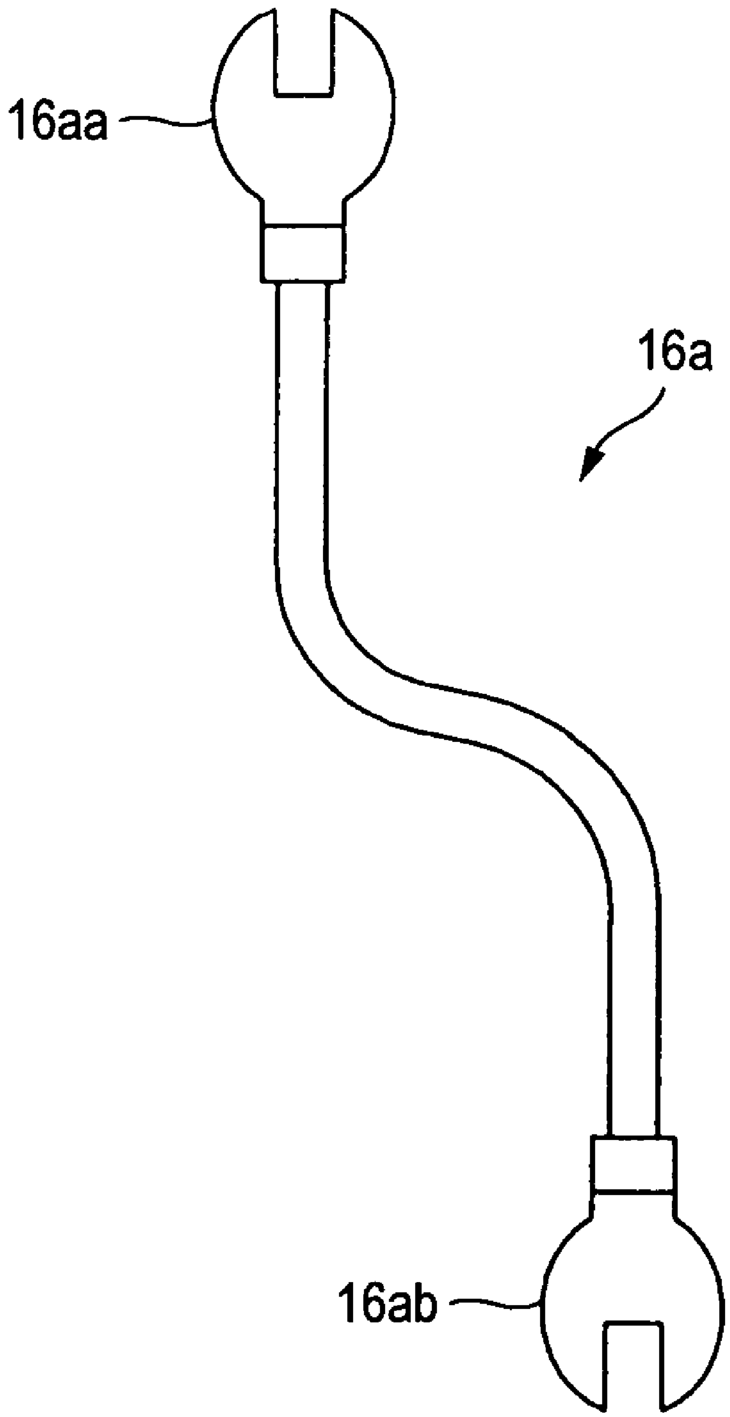
FIG. 6 is a schematic diagram illustrating the writing code included in the writing section in the engine control apparatus for the small motorboat according to the embodiment of the present invention.

This writing section 16 has at both ends the writing codes 16*a* (see FIG. 6) that can be connected or detached over the terminals c and d. When the connecting tools 16*aa* and the connecting tools 16*ab* formed at both ends of the writing code 16*a* are connected to the terminals c and d, respectively, the writing terminal a of the microcomputer 14 may be provided with a power source from the battery BT1 (a state in this manner in which the terminal is supplied with a power source is called the HI state). On the contrary, when the writing code 16*a* is detached from the terminals c and d, the writing terminal a of the microcomputer 14 is not supplied with a power source (a state in this manner in which the terminal is not supplied with a power source is called the LO state).

Specifically, when the microcomputer 14 recognizes that the power source supply from the writing terminal a is in the LO state, a normal operation is run (i. e., the engine is controlled based on the ID code from the transponder 9). When the microcomputer 14 recognizes that the power source supply from the writing terminal a is in the HI state, a writing mode is provided. The writing mode is a mode in which a regular ID code of a transponder is written to another transponder and the details will be described later based on a flowchart.

On the other hand, the stop switch knob 3 in the switch case 1 has at the upper part the display section 18 including five LEDs as shown in FIG. 1. Each of the LEDs composing the display section 18 is electrically connected, as shown in FIG. 5, to the microcomputer 14. This display section 18 maybe used to display the operation status of the writing section 16 and to display the engine performance corresponding to the ID code of the transponder 9.

Figure 7:
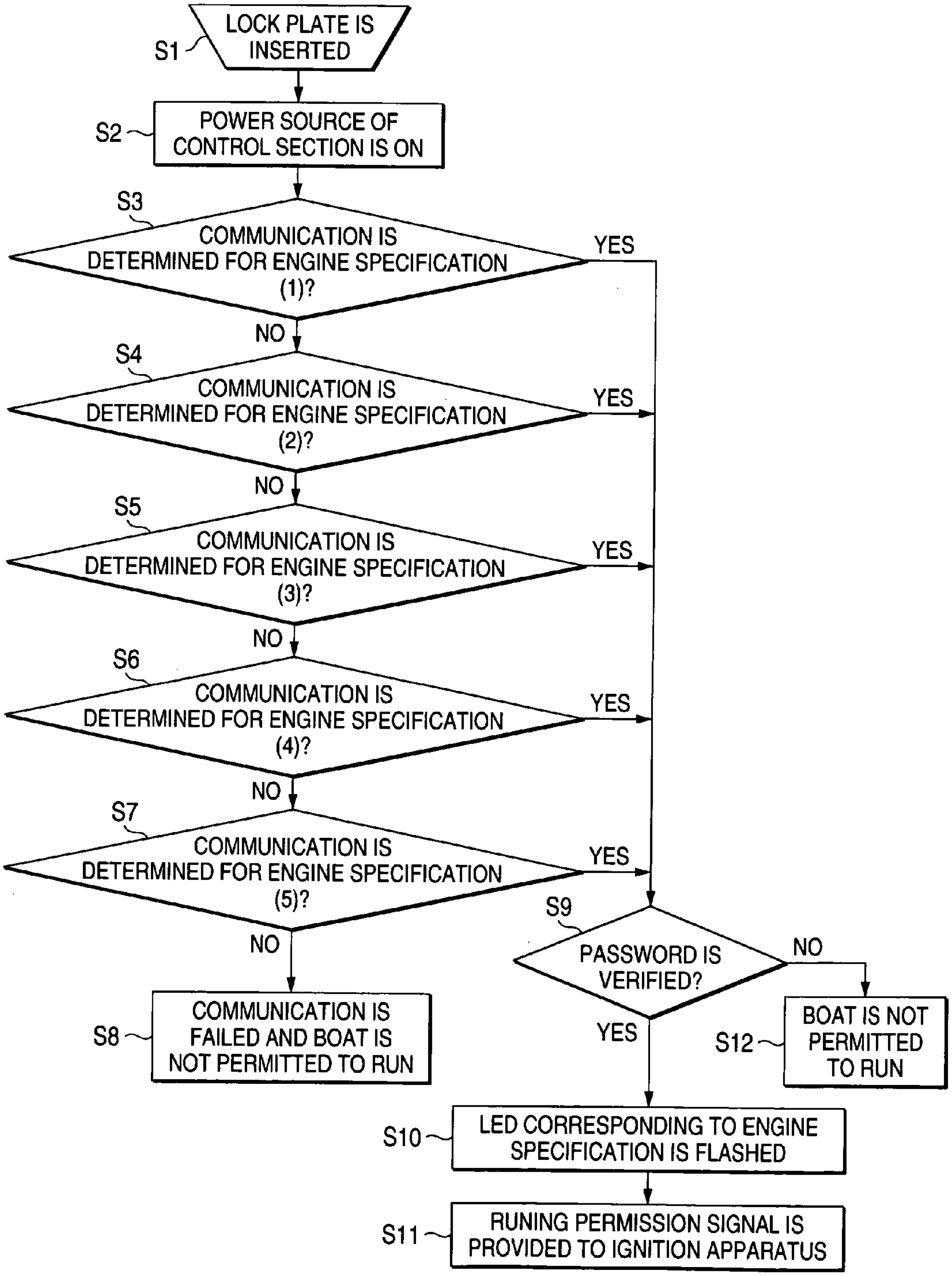
FIG. 7 is a flowchart illustrating the normal operation in the engine control apparatus for the small motorboat according to the embodiment of the present invention.

Next, the engine control apparatus for the small motorboat having the above structure will be described with reference to the control. First, when the boat is normally operated (in which a writing operation to the transponder is not provided), the lock plate 5 is inserted to the stop switch knob 3 (S1) as shown in the flowchart of FIG. 7 to allow the power source of the battery BT1 to be supplied to the power source terminal b of the microcomputer 14, thereby starting the control section 11 (S2).

Then, the ID code transmitted from the transponder 9 is received by the control section 11 to determine what is the engine performance specified by the ID code (S3–S7). Specifically, as described above, the engine performance can be set depending on the operator's preference to be a level for a race or an experienced user (high performance), a general level (cruise), a beginner level (course), or a children's level (run). Since the set information is included in the ID code, any of the engine specification settings is determined in S3 to S7 by the control section.

Then, when the ID code is determined to include any of the above engine specifications, the process proceeds to S9 in which the password included in the received ID code is verified. When the password is different from the previously registered regular password, the process proceeds to S12 in which the small motorboat is not permitted to run. Then, the engine is kept in an idling state in which the boat cannot run.

On the other hand, when the password in the received ID code coincides with the regular password, the process proceeds to S10 in which the display section 18 corresponding to the engine specification determined in S3 to S7 is lit. More specifically, the five LEDs of the display section 18 are allowed to correspond to the specified engine specifications, respectively, so that the LED corresponding to the engine specification determined. in S3 to S7 can be lit to notify the operator of the specified engine specification.

Thereafter, the microcomputer 14 included in the control section 11 sends to the ignition apparatus 17 a running permission signal, thereby allowing the small motorboat to run based on the specified engine specification (engine performance) (S11). When the received ID code (information specifying engine specification and unique password) is different from the previously registered one in S3 to S7, the process proceeds to S8 in which it is determined that communication with the transponder 9 is determined to fail and thus the small motorboat is not permitted to run.

Figure 8:
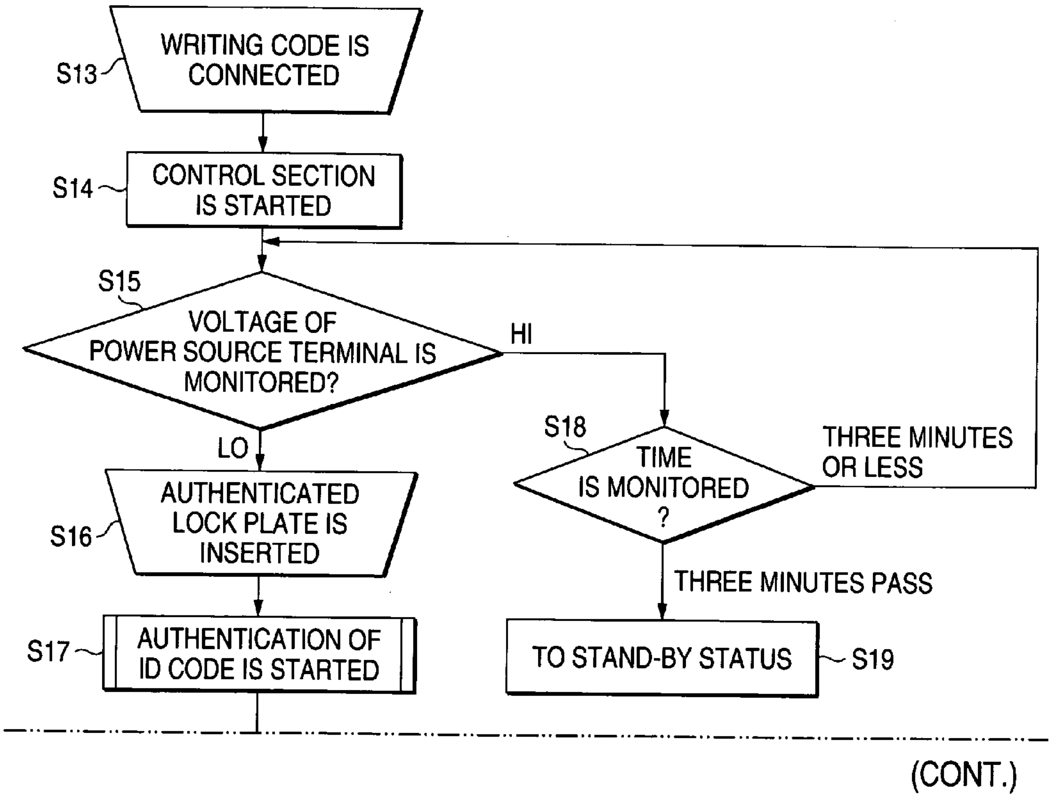
FIG. 8 is a flowchart illustrating the writing operation in the engine control apparatus for the small motorboat according to the embodiment of the present invention.
Figure 9:
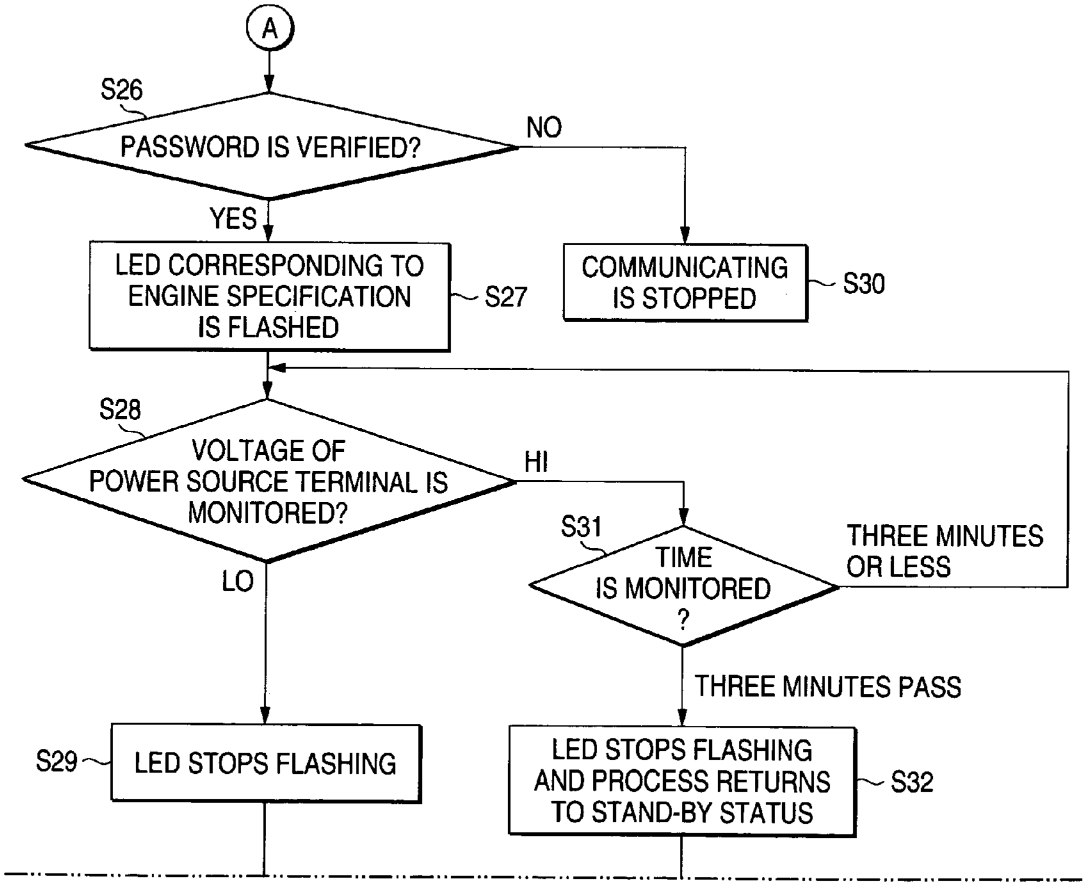
FIG. 9 is a flowchart illustrating the writing operation in the engine control apparatus for the small motorboat according to the embodiment of the present invention.
Figure 10:
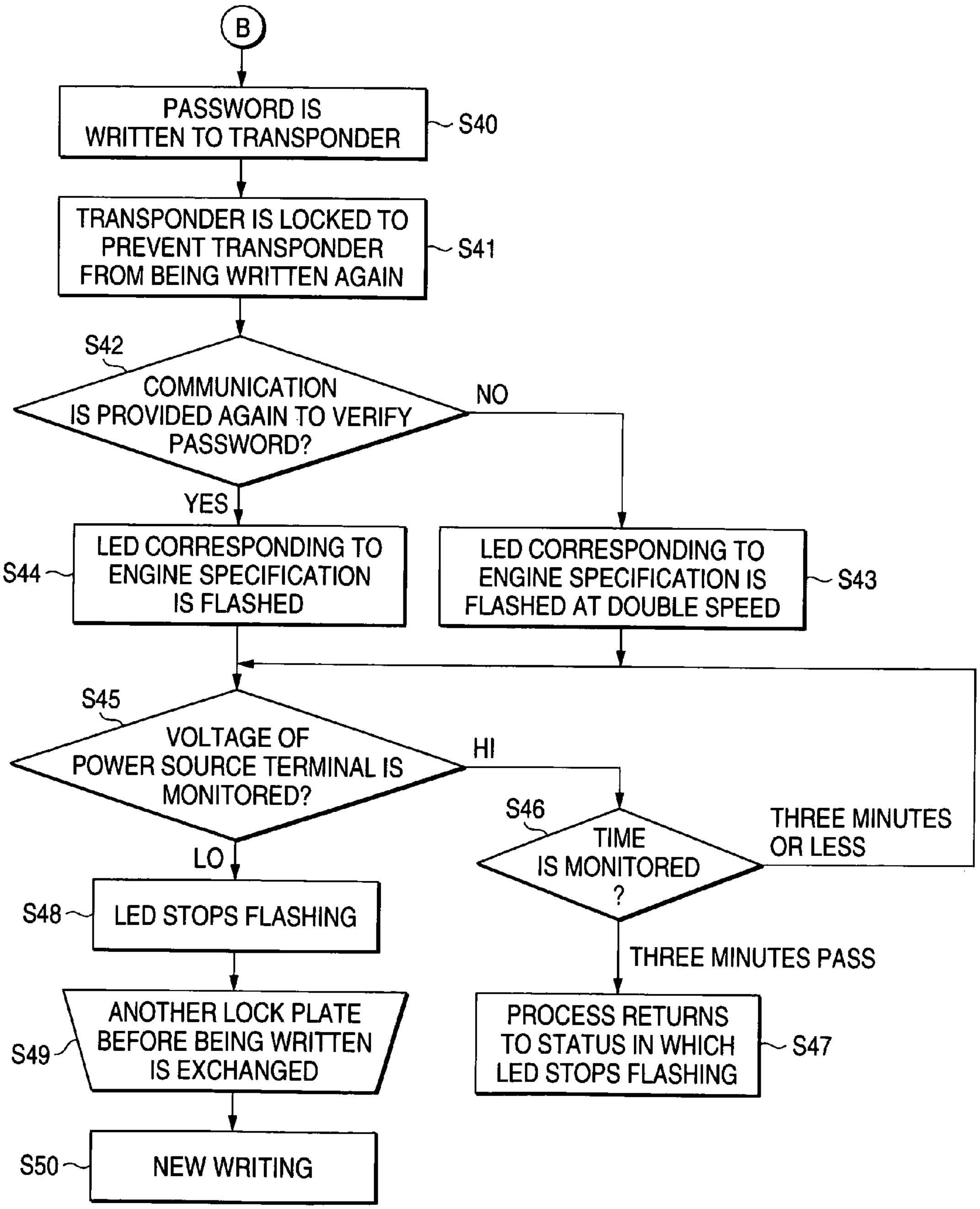
FIG. 10 is a flowchart illustrating the writing operation in the engine control apparatus for the small motorboat according to the embodiment of the present invention.

The engine control apparatus is controlled as described above. In this embodiment, the writing section 16 can write a regular ID code. This writing operation will be described based on the flowchart of FIG. 8 to FIG. 10.

First, the terminals c and d of writing section 16 are connected with the connection tools 16*aa* and 16*ab* of the writing code 16*a*, respectively (S13). This allows the power source of the battery BT1 to be supplied to the writing terminal a of the microcomputer 14, thereby starting the control section 11 (S14). Thereafter, the microcomputer 14 monitors the power source terminal b (S15). When the power source supply from the power source terminal b is in the LO state, the process proceeds to S18 in which the time is monitored (S18).

Then, when three minutes have passed since the power source supply to the power source terminal b is in the LO state, the process proceeds to S19 in which a stand-by state is provided. When the power source supply to the power source terminal b is in the HI state within three minutes (or when the writing terminal is continuously in the HI state), the process proceeds to S16 in which the currently-used lock plate 5 is inserted to the stop switch knob 3. This allows the ID code of the transponder 9 to be sent to the control section 11, thereby starting the authentication of the ID code (S17). Specifically, "writing mode" as described above is started.

Then, as in the normal operation, information in the ID code specifying the engine performance is determined (S20 to S24). When it is determined that the information includes any of the previously. specified engine specifications, the process proceeds to S26 in which the password included in the received ID code is verified. When the password is different from the previously registered regular password, the process proceeds to S30 as a wrong password, thereby stopping the communication with the transponder 9.

On the other hand, when the password in the received ID code coincides with the regular password, the process proceeds to S27 in which the display section 18 corresponding to the engine specification determined in S20 to S24 is flashed (S27). This allows an operator to be notified of the engine specification corresponding to a to-be-prepared ID code of a transponder. When there is no correspondence with any of the previously specified engine specifications in S20 to S24, the process proceeds to S25 in which communication with the transponder 9 is determined to fail.

Next, the power source terminal b in the microcomputer 14 is monitor (S28) in which, when the power source terminal b is in the HI state (i.e., state in which the currently-used lock plate 5 is inserted to the stop switch knob 3), time monitoring is carried out (S31) and, when three minutes have passed since the HI state is continually provided, the process proceeds to S32 in which the stand-by state is provided (and LED stops flashing). On the other hand, when the power source supply to the power source terminal b is in the LO state within three minutes (i.e., state in which the currently-used lock plate 5 is disengaged from the stop switch knob 3), the LED in the display section 18 stops flashing (S29).

Then, the lock plate 5 attached with another transponder is inserted to the stop switch knob 3. Another transponder has an ID code in which only an engine specification is previously specified and no unique password is written. Specifically, in this embodiment, only a unique password in the regular ID code of the transponder is written to another transponder to prepare a back-up transponder (lock plate). Alternatively, both of the engine specification and unique password in the regular ID code of the transponder may be written to another transponder.

When another lock plate (the one attached with a blank transponder) is attached by S33 is determined, then what is the information for specifying engine performance that the transponder has previously specified is determined (S34 to S38). When the information is determined as specifying any of the previously specified engine specifications, the process proceeds to S40 in which the regular password of the transponder is written to the transponder attached to another lock plate. When the information is determined as not specifying any of the previously specified engine specifications in S34 to S38, the process proceeds to S39 in which it is determined that communication with a new transponder is determined to fail.

When the regular password of the transponder is written to the transponder attached to another lock plate, S41 locks further processings in order to prevent the transponder from being written again. Thereafter, the new transponder is communicated again to check the written password (S42). When the password is confirmed as the regular one, the LED in the display section 18 corresponding to the specified engine specification is flashed, thereby allowing the microcomputer 14 to restart the monitoring of the power source terminal b (S45).

On the other hand, when S41 determines that the password written to the new transponder is different from the regular one, the process proceeds to S43 in which the LED corresponding to the specified engine specification in the display section 18 is flashed at double speed, then allowing S45 to monitor the power source terminal b. When the power source supply to the power source terminal b is in the HI state (i.e., when the new lock plate is inserted to the stop switch knob), then time monitoring is carried out (S46). When three minutes have passed since the HI state, the process proceeds to S47 in which the stand-by state is provided (and the LED stops flashing). On the other hand, when the power source supply to the power source terminal b is in the LO state within three minutes (i.e., when the new lock plate is disengaged from the stop switch knob), the LED in the display section 18 stops flashing (S48).

In this way, the operation for writing the regular ID code of the transponder to another transponder is completed. In order to carry out the same writing operation for other transponders, the subsequent steps of S49 (in which a lock plate attached with other transponders is inserted to a stop switch knob) and S50 (in which an ID code is written to the transponder) are performed. The engine control apparatus for the small motorboat according to the above embodiment allows a user to prepare a back-up transponder in an easy manner.

The embodiment is described as in the above, however, the present invention is not limited to this. For example, the transponder 9 also may be inserted to and buried in the lock plate. Alternatively, the LED as the display section 18 also may be provided with another position in the switch case 1 in addition to the position in this embodiment. The display section 18 (not limited to LED) also maybe provided at a position other than the one in the switch case 1.

The writing section 16 according to this embodiment attaches or detaches from the writing code 16*a* to allow the microcomputer 14 in the control section 11 to determine whether the operation is a normal operation or a writing operation. Instead of this, the switches are placed in the wiring L5 (see FIG. 5), and determination between a normal operation and a writing operation also may be carried out by turning the above switches on/off. Although this embodiment is applied to a small motorboat, this embodiment also maybe applied to other machines (e.g., ATV or snowmobile).

According to the invention of Aspect 1, the writing section can be used to write a regular ID code of a transponder to another transponder, thus allowing the user to easily prepare a back-up transponder in a case where the transponder is lost.

According to the invention of Aspect 2, the control section changes the engine performance based on the ID code from the transponder. When the writing section writes a regular ID code of a transponder to another transponder, a to-be-specified engine performance can be changed. Thus, a plurality of back-up transponders for which an engine performance can be specified arbitrarily can be prepared.

According to the invention of Aspect 3, the display section is provided for displaying the differences in engine performance specified for the transponder. Thus, the differences in of the performance can be recognized and checked both in a normal operation and a writing operation.

What is claimed is:

1. An engine control apparatus comprising:

a stop switch body for allowing an engine to stop or to be in an idling state;

a stop switch knob that abuts with the stop switch body to activate the stop switch body to allow the engine to stop or to be in an idling state;

a lock plate that is insertable to the stop switch knob;

a transponder that is provided at the lock plate side and that can transmit a predetermined ID code;

a control section that can receive the ID code transmitted from the transponder and that can control based on the ID code the engine operation; and a writing section for writing a regular ID code of a transponder to another transponder, wherein when the lock plate is disengaged from the stop switch knob, the stop switch body is activated to allow the engine to stop or to be in an idling state.

2. The engine control apparatus according to claim 1, wherein the control section changes the engine performance based on the ID code from the transponder and, when the writing section is used to write the regular ID code of a transponder to another transponder, a to-be-specified engine performance can be changed.

3. The engine control apparatus according to claim 1, further comprising:

a display section for displaying the difference in the engine performance specified for the transponder.

4. The engine control apparatus according to claim 1, wherein the transponder is inserted to and buried in the lock plate.

* * * * *